United States Patent [19]

Mori et al.

[11] 4,170,212

[45] Oct. 9, 1979

[54] IGNITION SYSTEM FOR ROTARY PISTON ENGINES

[75] Inventors: Kouichi Mori, Okazaki; Toshihiko Igashira, Toyokawa; Shunzo Yamaguchi, Okazaki; Hisasi Kawai, Toyohashi; Seiji Morino, Okazaki, all of Japan

[73] Assignee: Toyota Jidosha Kogyo Kabushiki Kaisha, Toyota, Japan

[21] Appl. No.: 860,218

[22] Filed: Dec. 13, 1977

[30] Foreign Application Priority Data

Dec. 26, 1976 [JP] Japan ............................... 51-157283

[51] Int. Cl.$^{2}$ ............................................... F02B 53/12

[52] U.S. Cl. ............................... 123/211; 123/145 A; 123/148 DS

[58] Field of Search ............ 123/145 A, 148 DS, 210, 123/211

[56] References Cited

U.S. PATENT DOCUMENTS 3,812,827 5/1974 Linn .................................... 123/211

3,970,049 7/1976 Yamaguchi et al. ................. 123/211

FOREIGN PATENT DOCUMENTS 1928648 12/1970 Fed. Rep. of Germany ........... 123/211

1248779 10/1971 United Kingdom ..................... 123/211

*Primary Examiner*—William L. Freeh

*Assistant Examiner*—Michael Koczo, Jr.

*Attorney, Agent, or Firm*—Cushman, Darby & Cushman

[57] ABSTRACT

An ignition system for rotary piston engines includes a glow plug in addition to the normal leading spark plug and trailing spark plug. The glow plug is mounted in the housing of the engine on the leading side with respect to the trochoidal minor axis in the direction of the rotor rotation and performs continuous ignition of the mixture during low speed and load operation of the engine. Thus, during the low speed and load operation the glow plug performs ignition in place of the leading spark plug whereas during other engine operating conditions the leading spark plug and the trailing spark plug perform the ignition of the mixture.

5 Claims, 5 Drawing Figures

31
32
$V_R$
311
222
30
322
24
321
$e_R$
320
22
GLOW PLUG
$e_{OUT}$
310
25
35
351
28
33
34
354
355
358
PRESSURE SENSOR
AMPLIFIER
PRESSURE SETTING CIRCUIT
350
260
38
40
353
26
261
TACHOMETER CIRCUIT
SPEED SETTING CIRCUIT
IGNITION CIRCUIT
357
356
359
DELAY CIRCUIT
352
36
39
WAVE FORM RESHAPING CIRCUIT
37
20
SPARK PLUG

IGNITION SYSTEM FOR ROTARY PISTON ENGINES

BACKGROUND OF THE INVENTION

1. FIELD OF THE INVENTION

The present invention relates to rotary piston engines, and more particularly the invention relates to an ignition system for rotary piston engines. Namely, the present invention relates to improvements on such ignition system for ensuring stable combustion during the periods of low speed and load operation of the engine.

2. DESCRIPTION OF THE PRIOR ART

With a known type of rotary piston engine, a spark plug is mounted on each side of the trochoidal minor axis of the housing and the engine is operated by means of the two spark plugs. With this system, during the periods of low speed and load operation, such as, during the periods of idling operation, due to the recirculation of a large quantity of exhaust gases which is inherent to the engine itself, the combustion tends to become unstable thus giving rise to misfiring or uneven combustion with the resulting variation of the torque. While such uneven combustion can be reduced in some degree by increasing the engine speed or by decreasing the air-fuel ratio of the mixture (by enriching the mixture), this is not an effective means of overcoming the difficulty, since the increased engine speed and the enriched mixture tend to deteriorate the fuel consumption considerably. As a result, such uneven combustion results in the emission of a large quantity of HC, and moreover the increased surface/volume ratio of the working chambers results in the emission of a very large quantity of HC as compared with that of the four-cycle reciprocating engines. Thus, the rotary piston engines equipped with an exhaust gas reactor have serious problems of reactor durability and secondary air pollution due to the heating of the reactor.

SUMMARY OF THE INVENTION

With a view to overcoming the foregoing difficulties, it is an object of the present invention to provide an improved ignition system for rotary piston engines, which is capable of ensuring stable combustion during the periods of low engine speed and load operation.

It is another object of the invention to provide such ignition system which is capable of eliminating the occurrence of uneven combustion during the periods of low engine speed and load operation and thereby improving the fuel consumption and drivability.

To accomplish the above and other objects, the ignition system according to the invention comprises, in addition to the ordinary trailing and leading park plugs, one or a plurality of glow plugs mounted on the leading side with respect to the trochoidal minor axis of the housing in the direction of the rotor rotation, whereby during the periods of low speed and low load operation, e.g., idling operation (e.g., during the operations where uneven combustion is likely to occur), the occurrence of uneven combustion is prevented by continuously igniting the mixture by means of the glow plug. Also in accordance with the present invention, during the periods of high load operation the operation of the glow plug is stopped and the mixture is ignited by the two spark plugs so as to prevent the occurrence of knocking and increase the durability of the glow plug.

In the specification of this application, the spark plug is defined as one which ignites the mixture by means of intermittent spark discharges and the glow plug is defined as one which when at red heat is capable of continuously igniting the mixture.

DESCRIPTION OF THE PREFERRED EMBODIMENT

Figure 1:
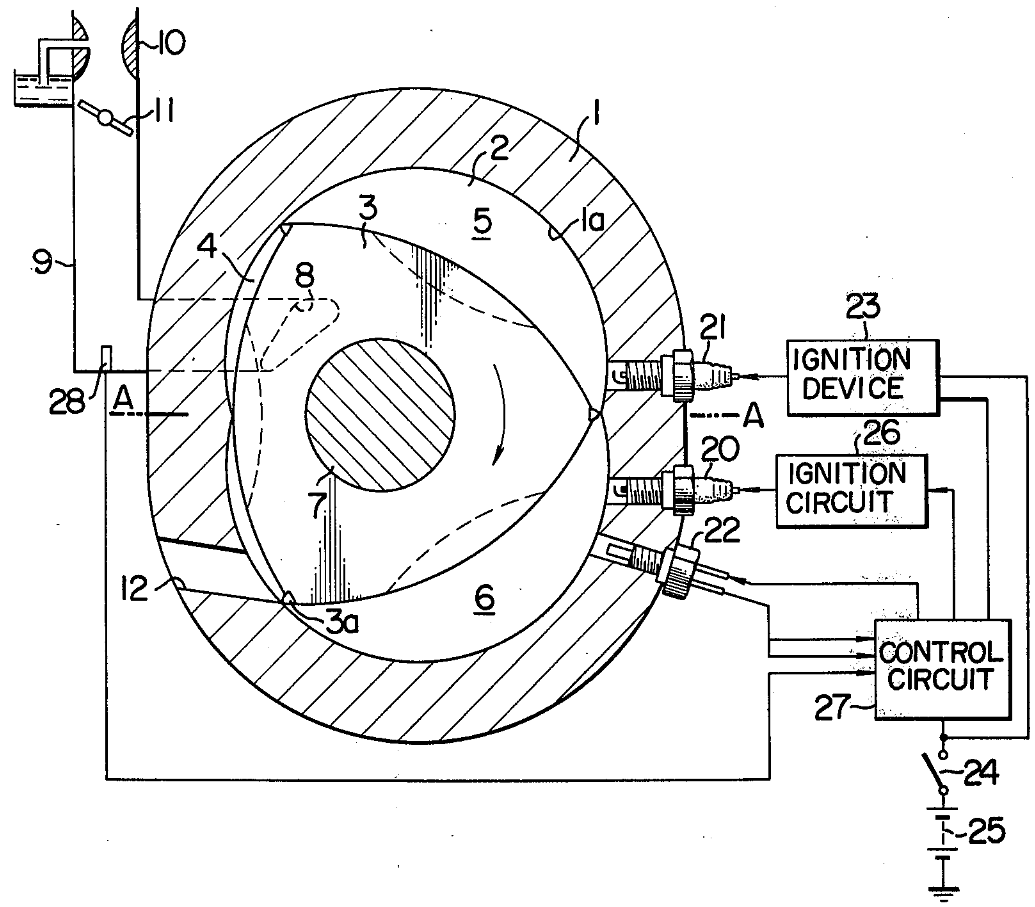
FIG. 1 is a schematic diagram showing a rotary piston engine incorporating the ignition system according to the invention.

Referring now to FIG. 1, a rotary piston engine incorporating the system of this invention includes a housing having a peripheral wall 1 with a trochoidal inner surface 1*a* and side walls 2 disposed to close the ends of the peripheral wall 1, and the engine further includes a rotor 3 disposed inside the housing. The three-lobe shaped rotor 3 has an apex seal 3*a* disposed at each of its apices to contact with the trochoidal inner surface 1*a* of the housing peripheral wall 1 and thereby to form three working chambers 4, 5 and 6 between the housing and the rotor 3. The rotor 3 performs planetary movement in the direction of the arrow in the Figure to move and vary in volume each of the working chambers 4, 5 and 6 and thereby to perform the intake, compression, combustion and exhaust strokes for each explosion of the working fluid (the air-fuel mixture). In this case, the torque of the rotor 3 is delivered to the outside through an output shaft 7. An intake port 8 provided in the housing side wall 2 is adapted to supply mixture into the working chamber on the intake stroke, and the intake port 8 is connected to a carburetor 10 through an intake pipe 9. The carburetor 10 includes a throttle valve 11 of the known type which controls the amount of the mixture drawn into the engine. An exhaust port 12 is formed in the peripheral wall 1 to discharge the exhaust gases, and the exhaust port 12 is connected to an exhaust cleaning device, e.g., a three-way catalyst which is not shown.

The ignition system of this invention includes at least three ignition plugs which are fitted in the ignition hole provided in the housing peripheral wall 1. Of these three ignition plugs, two are spark plugs and these spark plugs are disposed on both sides of a trochoidal minor axis A of the housing peripheral wall 1. One of the spark plugs which is located on the leading side with respect to the trochoidal minor axis A in the direction of rotation of the rotor 3 is a leading spark plug 20, and the other which is located on the trailing side is a trailing spark plug 21. The remaining ignition plug is a glow plug 22 which is located on the leading side with respect to the leading spark plug 20 in the direction of the rotor rotation (or alternatively the glow plug 22 may be located at a position substantially the same with the leading spark plug 20).

Figure 2:
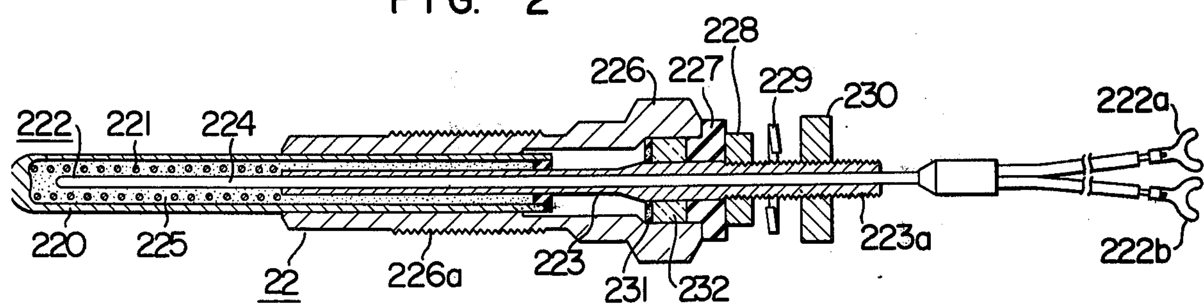
FIG. 2 is a sectional view showing in detail the glow plug shown in FIG. 1.

The leading and trailing spark plug 20 and 21 are identical with the conventional spark plugs. Although the glow plugs 22 may be of the known type, the one shown in FIG. 2 is used for the glow plug 22.

The construction of the glow plug 22 will now be described in detail with reference to FIG. 2. In the Figure, numeral 221 designates a heating coil consisting of a coiled nichrome wire or the like and mounted within a casing or metal pipe 220. The heating coil 221 has its one end hermetically connected by welding to the metal pipe 220 made for example of stainless steel and its the other end connected by welding to a hollow shaft 223 having a threaded terminal portion 223a. Inserted in the hollow shaft 223 is a thermocouple sheath 224 whose forward end is located close to the forward end of the pipe 220. The metal pipe 220 is densely filled with a heat resisting, electrically insulating powder 225 consisting for example of magnesia, so that the heating coil 221 and the sheath 224 are fixedly held in place and also the metal pipe 220 and the sheath 224 are electrically insulated from each other.

A thermocouple 222 is of the known non-grounded type having its thermojunction electrically insulated from the sheath, and it includes terminals 222a and 222b. Numeral 226 designates a plug body of an electrically conducting metal having a mounting threaded portion 226a for mounting to the engine housing, and the plug body 226 is hermetically connected by soldering or the like to the outer surface of the metal pipe 220. A ring-shaped ceramic electric insulating plate 231 is inserted and positioned in the space between the open end of the plug body 226 and the hollow shaft 223, and a heat resisting glass sealing member 232 produced by filling into, melting at a suitable temperature and solidifying a glass material (e.g., borosilicate glass) it also mounted in the space of the open end of the plug body 226 which is on the outer side of the insulating plate 231, thus enclosing hermetically the space between the plug body 226 and the hollow shaft 223. Numeral 227 designates an electrical insulator bushing made of Bakelite or the like, which is fitted in the open end of the plug body 226 on the upper side of the heat resisting sealing member 232 hermetically sealing the space between the plug body 226 and the hollow shaft 223. By threadedly fitting a locking nut 228 on the threaded terminal 223a of the hollow shaft 223, the electric insulating bushing 227 is fixedly mounted in place. Numeral 229 designates a spring washer, and 230 a terminal nut to which are attached the lead wires which are not shown. The purpose of the thermocouple 222 is to discriminate whether the glow plug 22 has been heated to a mixture igniting temperature (usually on the order of 900° C. to 1100° C.).

The temperature of the glow plug can be discriminated without using the therocouple, and it can be detected by means of the electric resistance of the heating coil itself. If the heating coil is made of a pure metallic material, such as, nickel (Ni) or platinum (Pt), its electric resistance will change linearly with temperature, thus making the detection of temperature easier. For example, where a nickel material is used for the heating coil, when its resistance value becomes about 5 times the resistance at room temperature, it is an indication that the temperature of the heating coil has attained a mixture igniting level.

However, the following description will be made in connection with the glow plug of FIG. 2 including the thermocouple 222.

The trailing spark plug 21 is connected to an ignition device 23 of the known type, and the ignition device 23 is connected to a battery 25 through a key switch 24. Consequently, the trailing spark plug 21 provides the spark discharges throughout the range of the engine operating conditions. The leading spark plug 20 is connected to an ignition circuit 26 which in turn is connected to a control circuit 27. The control circuit 27 is also connected to the glow plug 22 and to the battery 25 through the key switch 24 so as to control the operation of the leading spark plug 20 and the glow plug 22. To accomplish this control in accordance with the operating conditions of the engine, the control circuit 27 is connected to a pressure sensor 28 mounted in the intake pipe 9 downstream of the throttle valve 11, engine speed detecting means which is not shown and the thermocouple of the glow plug 22.

Basically, the operation of the control circuit 27 is so designed that during the periods of low engine speed and load operation, the operation (the spark discharge) of the leading spark plug 20 is stopped and the glow plug 22 is energized and kept red hot. During the periods of other operations (i.e., during the periods of high speed and low load operation and high load operation), the glow plug 22 is deenergized and the leading spark plug 20 is actuated. During the transistion from the other operation to the low speed and low load operation, the operation of the leading spark plug 20 is continued for a predetermined period of time until the energized glow plug 22 attains a high enough temperature for ignition. As mentioned previously, the trailing spark plug 21 is brought into operation throughout the range of the engine operating conditions irrespective of the operation of the control circuit 27.

Figure 3:
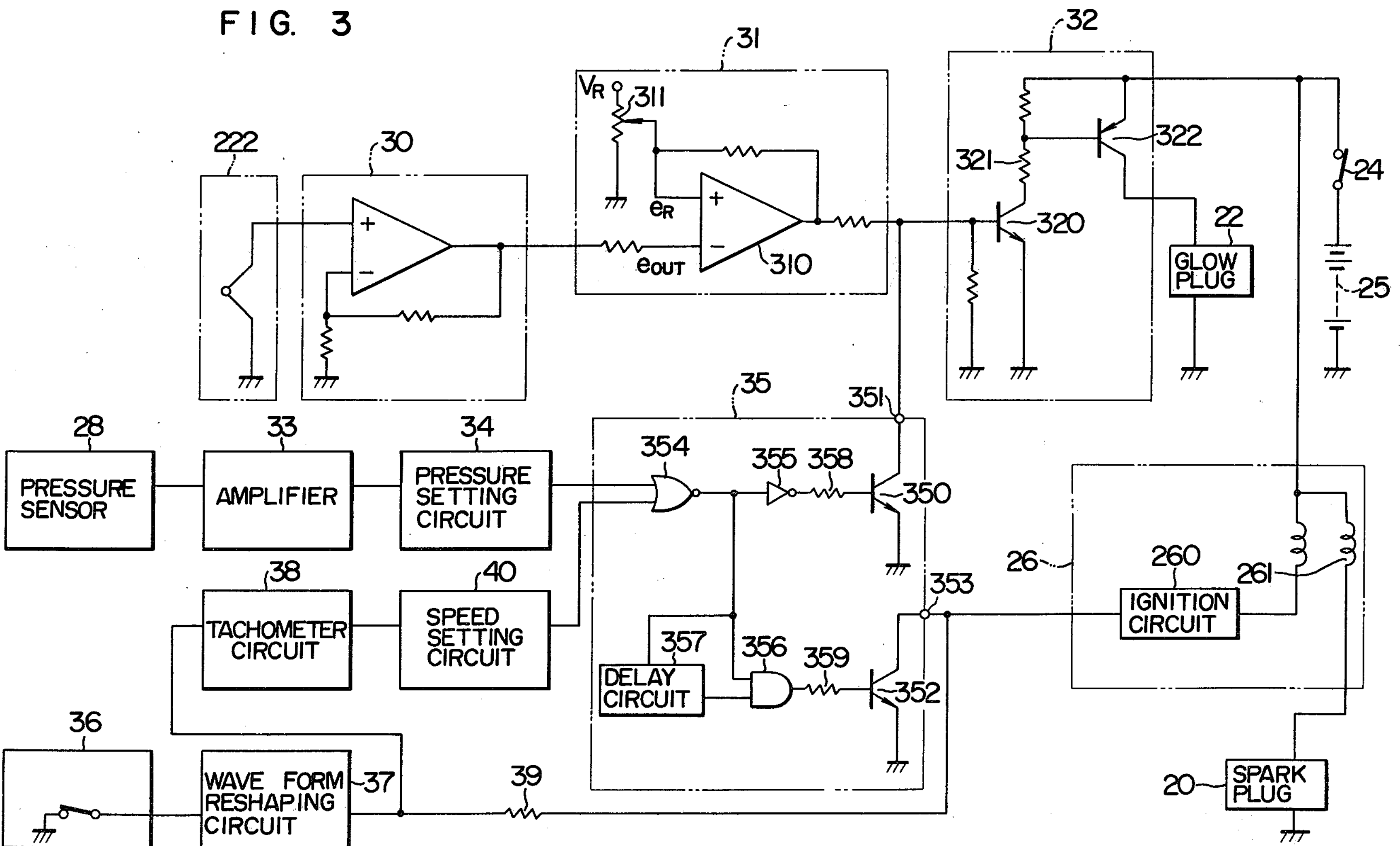
FIG. 3 is a circuit diagram showing in detail the control circuit shown in FIG. 1.

The control circuit 27 will now be described in detail with referece to FIG. 3. In the Figure, the positive electrode of the temperature detecting thermocouple 222 incorporated in the glow plug 22 is connected to the positive input terminal of a noninverting DC amplifier 30 whose output is connected to a temperature setting circuit 31. The temperature setting circuit 31 comprises a voltage comparator 310 having its negative input terminal connected to the output of the amplifier 30 and its positive input terminal connected to the variable terminal of a variable resistor 311. A fixed voltage $V_R$ is applied to the fixed terminal of the variable resistor 311. Consequently, when the temperature of the glow plug 22 is lower than a preset temperature $T_0$ (e.g., 900° C.) which is high enough to ignite the mixture, the output voltage of the thermocouple 222 is low so that the resulting amplified voltage $e_{out}$ of the amplifier 30 is lower than a preset voltage $e_R$ and the temperature setting circuit 31 generates a "1" level voltage. The output voltage of the temperature setting circuit 31 is applied to a power circuit 32. In the power circuit 32, its input is connected to the base of an NPN transistor 320, and the transistor 320 has its emitter connected to the ground and its collector connected to the base of a power transistor 322 through a resistor 321. The power transistor 322 has its emitter connected to the positive electrode of the battery 25 and its collector connected to the glow plug 22.

The pressure sensor 28 mounted in the engine intake pipe 9 to detect the pressure therein has its output connected to the input of an amplifier 33 whose output is connected to the input of a pressure setting circuit 34. The output of the pressure setting circuit 34 is connected to one input of a NOR gate 354 in a logic circuit 35. The amplifier 33 is identical in construction with the amplifier 30, and the pressure setting circuit 34 is identical in construction with the temperature setting circuit 31. Consequently, the output of the pressure setting circuit 34 responds to the output of the pressure sensor 38 so that the output goes to the "1" level at the high load operation where the engine intake pressure becomes higher than a preset pressure, and the output goes to the "0" level at the low load operation where the intake pressure becomes lower than the preset pressure.

The engine speed detecting means comprises a distributor interrupter 36 for the leading spark plug, and the output of the interrupter 36 is connected to the input of a waveform reshaping circuit 37 whose output is connected to the input of a tachometer circuit 38 and to the input of an ignitor 260 of the leading spark plug ignition circuit 26 through a resistor 39. The output of the tachometer circuit 38 is connected to the input of a speed setting circuit 40. The speed setting circuit 40 is similar in circuit construction with the temperature setting circuit 31 and its output is connected to the other input of the NOR gate 354 in the logic circuit 35.

The rotational speed of the engine is detected by the tachometer circuit 38 and the speed setting circuit 40. More specifically, the output of the waveform reshaping circuit 37 consists of the pulse waveform obtained by subjecting the intermittent signals from the distributor interrupter 36, and this pulse waveform is applied to the tachometer circuit 38 in which the applied waveform is converted into an analog voltage corresponding to the engine speed. This analog voltage is compared with a preset value in the speed setting circuit 40. Thus, when the engine speed exceeds a preset speed, the speed setting circuit 40 generates a "1" output, and it generates a "0" output during the periods of low speed operation where the engine speed is lower than the preset speed.

The logic circuit 35 includes the NOR gate 354 connected to the output terminals of the pressure setting circuit 34 and the speed setting circuit 40 as mentioned previously, and the output of the NOR gate 354 is applied to the base of a first output transistor 350 through an inverter 355 and a resistor 358. Also the output of the NOR gate 354 is applied to the base of a second output transistor 352 through an AND gate 356, a delay circuit 357 and a resistor 359.

Consequently, the NOR gate 354 generates a "1" level signal only when the outputs of the pressure setting circuit 34 and the speed setting circuit 40 are simultaneously at the "0" level, and the NOR gate 354 generates a "1" level signal in any other condition.

When the output of the NOR gate 354 goes to the "0" level, the first transistor 350 is turned on and the second transistor 352 is turned off. The resulting collector potentials of the first and second transistors 350 and 352 are respectively applied through their output terminals 351 and 353 to the base of the transistor 320 and the ignitor 260.

When the output of the NOR gate 354 changes from the "0" level to the "1" level, the first output transistor 350 is turned off without delay and the second output transistor 352 is switched from the nonconductive condition to the conductive condition after the expiration of a predetermined time which is determined by the delay circuit 357.

In the ignition circuit 26, the output of the ignitor 260 is connected to the primary coil of an ignition coil 261 whose secondary coil is connected to the leading spark plug 20. The battery 25 is connected to the ignition coil 261.

With the construction described above, the ignition system of this invention operates as follows.

When the key switch 24 is closed and the engine is started, the trailing spark plug 21 performs the sparking operation throughout the range of the engine operating conditions in response to the operation of the ignition device 23.

On the other hand, the leading spark plug 20 and the glow plug 22 operate in the following manner in response to the operating conditions of the engine.

When the engine is at the low speed and load operation, namely, when the engine intake pressure is lower than the preset pressure and the engine speed is also lower than the preset speed, the outputs of the pressue and speed setting circuits 34 and 40 both go the the "0" level. Consequently, the output of the NOR gate 354 in the logic circuit 35 goes to the "1" level so that the first output transistor 350 is turned off and the second output transistor 352 is turned on. With the second output transistor 352 being turned on, the interrupter 36 applies no ignition timing signal to the ignitor 260 and consequently the leading spark plug 20 does not perform the sparking operation. On the other hand, if the temperature of the glow plug 22 is lower than the preset temperature (about 900° C.) at this low speed and load operation of the engine, the output of the temperature setting circuit 31 goes to the "1" level. Since the first output transistor 350 of the logic circuit 35 is in the nonconductive condition at this time, this "1" level signal is applied to the base of the transistor 320 of the power circuit 32 and the transistor 320 is turned on. As a result, the power transistor 322 is also turned on and the glow plug 22 is energized thus increasing its temperature. The preset temperature $T_0$ is dependent on the preset voltage $e_R$. When the temperature of the glow plug 22 rises so that the output voltage of the thermocouple 222 rises and the resulting voltage $e_{out}$ becomes equal to or higher than the preset voltage $e_R$, the output of the temperature setting circuit 31 goes to the "0" level thus producing no voltage and consequently the power circuit 32 is opened thus interrupting the current flow to the glow plug 22. When this occurs, the temperature of the glow plug 22 decreases and the output voltage $e_{out}$ becomes lower than the preset voltage $e_R$, thus again energizing the glow plug 22 through the power circuit 32. In this way, when the glow plug 22 is in operation, it is repeatedly energized and deenergized to maintain it at the mixture igniting preset temperature.

Next, the ignition operation during the periods of high load and/or high speed operation of the engine where the engine intake pressure and/or the engine speed become higher than the preset values, will be described.

When at least one of the engine intake pressure and the engine speed exceeds the preset value, the output of the NOR gate 354 in the logic circuit 35 changes from the "1" level to the "0" level. When this occurs, the first output transistor 350 is turned on and at the same time the second output transistor 352 is turned off. Consequently, the glow plug 22 is deenergized and at the same time the ignition operation by the leading spark plug 20 is started.

Next, the operation of the leading spark plug 20 and the glow plug 22 during the periods of transition of the engine operation from the high load and/or high speed operation to the low load and speed operation, will be described.

When the engine operation changes from the high load and/or high speed operation to the low load and speed operation, the output of the NOR gate 354 in the logic circuit 35 also changes from the "0" level to the "1" level. The output of the NOR gate 354 is applied to one input of the AND gate 356 and to the other input of the AND gate 356 through the delay circuit 357. The delay circuit 357 is designed so that during the transition of its input from the "0" to "1" level, it maintains the input at the "0" level for a predetermined period of time, and this predetermined time corresponds to the time required for the glow plug 22 to attain a temperature capable of igniting the mixture upon switching of the glow plug 22 from the deenergized condition to the energized condition. Consequently, when the output of the NOR gate 354 changes from the "0" to "1" level, the AND gate 356 maintains the "0" output thus allowing the leading spark plug 20 to remain in operation for the predetermined time.

In this way, during the low speed and low load operation of the engine where the outputs of the pressure and speed setting circuits 34 and 40 both go to the "0" level, the logic circuit 35 energizes the glow plug 22 and stops the spark discharges of the leading spark plug 20. Under the other operating conditions of the engine, the glow plug 22 is deenergized and the leading spark plug 20 is brought into operation. During the transition from the latter operating condition to the former operation, the leading spark plug 20 is kept in operation until the glow plug 22 is heated to red hot.

With the ignition system described above, at the low speed and low load operation of the engine, such as, at the idling operation, the mixture is ignited by means of the glow plug 22 mounted on the leading side with respect to the trochoidal minor axis of the housing in the direction of the rotor rotation and the trailing spark plug 21 on the trailing side. The glow plug 22 continuously ignites the mixture with a wide ignition surface as compared with that of the spark plugs. While, during the low speed and low load operation, a large quantity of recirculated exhaust gases exist in the working chambers due to the inherent characteristics of the rotary piston engine, the continuous ignition of the mixture by the glow plug 22 ensures a stable complete combustion of the mixture without the occurrence of misfiring or uneven combustion. This results in reduced HC emissions and improved fuel consumption.

Figure 5:
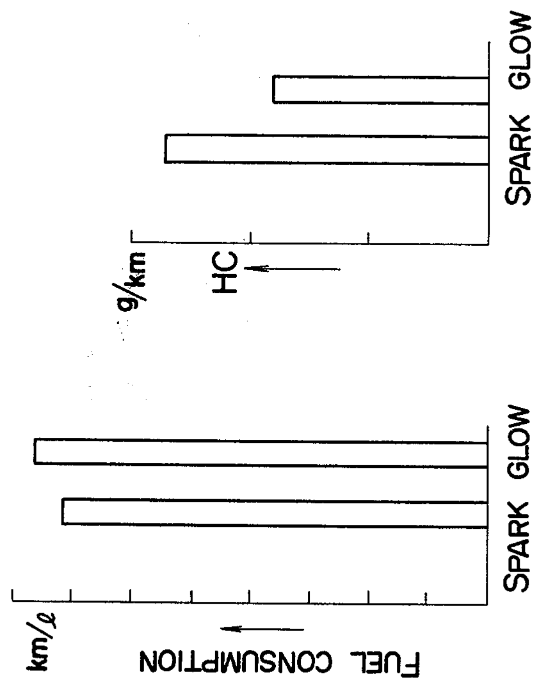
FIGS. 4 and 5 show the comparative experimental data on the fuel consumption and the amounts of HC emission obtained with the system of this invention and the conventional system.
Figure 4:
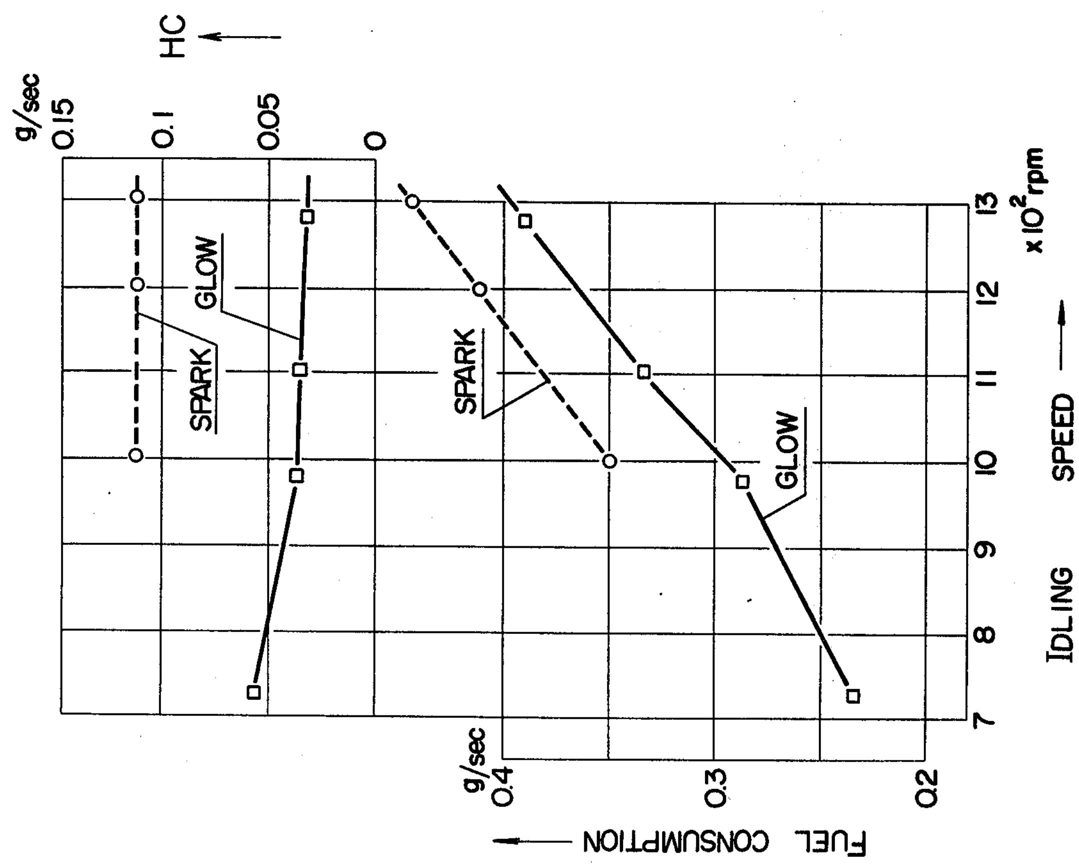

FIGS. 4 and 5 illustrate the test results which substantiate the above-mentioned effects. In these tests, the idling operation and the constant speed operation at 40 km/h (the operation at the engine speed of about 1500 rpm and intake pressure of about 380 mm Hg) were taken as examples of the low speed and low load operation and the resulting HC emissions and fuel consumptions were measured. FIG. 4 shows the measurement results under the idling conditions, and in the Figure the abscissa represents the idling speed. FIG. 5 shows the measurement results obtained under the constant speed operation at 40 km/h. In the Figures, indicated as "glow" are the measured values obtained with the above-described ignition system (the ignition by the glow plug and the trailing spark plug), and indicated as "spark" are the measured values obtained by effecting the ignition with the conventional leading and trailing spark plugs. The air-fuel ratios of the mixtures were 14.3:1 at the idling operation and 16:1 at the constant speed operation.

As will be seen from these test results, the ignition system of this invention has the effect of markedly reducing HC emissions and improving the fuel consumption. The glow plug 22 must always be mounted on the leading side with respect to the housing trochoidal minor axis, and the provision of the glow plug on the trailing side tends to cause preignition or decrease the power output markedly.

When the engine comes into the high speed operation or high load operation, the control circuit 27 deenergizes the glow plug 22 and thus the glow plug 22 stops its igniting action. Instead, the leading spark plug 20 comes into operation and performs the igniting action. Since the amount of the recirculated exhaust gases is small under the high speed or high load operation, even with the ignition of mixture by the spark plugs, stable combustion of the mixture can be ensured without the occurrence of uneven combustion. This is rather advantageous, since the spark ignition has the effect of increasing the power output of the engine. Particularly, when the engine is at the high load operation, while the ignition of the mixture by the glow plug has the danger of causing knocking, the occurrence of knocking can be eliminated by causing the leading spark plug to function in place of the glow plug. Further, while the operation of the glow plug during the high load operation causes its temperature to rise to a very high level thus giving rise to a difficult problem from the durability point of view, the ignition system of this invention has no danger of causing such difficulty. In this connection, the glow plug 22 is provided with the thermocouple 222 to maintain the temperature of the glow plug 22 constant, and this also has the effect of increasing the durability of the glow plug 22. Of course, this also results in the reduction of the power consumption.

It will thus be seen that with the ignition system of this invention, during the periods of low speed and low load operation where the ignition of the mixture by the spark plugs alone tends to cause a difficult problem from the mixture combustion point of view, the continuous ignition of the mixture by the glow plug can ensure a stable combustion of the mixture, and during the periods of high speed or high load operation where the ignition of the mixture by the glow plug tends to cause difficult problems from the standpoint of the engine power output, knocking and glow plug durability, the operation of the glow plug is stopped and the ignition of the mixture is effected by the two spark plugs, thus, ensuring the proper engine power, preventing the occurrence of knocking and increasing the durability of the glow plug.

While, with the ignition system of this invention, the threshold engine speed between the low speed operation and the high speed operation and the threshold intake pressure between the low load operation and the high load operation are selected in consideration of the above-mentioned problems of uneven combustion, engine power output, etc., the results of the tests conducted showed that the desirable results could be obtained by selecting the former about 2000 rpm and the latter about 640 mm Hg (−120 mm Hg in terms of negative pressure).

On the other hand, owing to its properties, the glow plug requires a certain time from the instant that the glow plug is energized until it is heated to red hot, and thus during the periods of transition from the operation where the operation of the glow plug 22 is stopped to the operation where the operation of the leading spark plug 20 is stopped and the glow plug 22 is brought into operation, the leading spark plug 20 is maintained in operation for a predetermined time by the control circuit 27. After the glow plug 22 has been enabled to ignite the mixture, the operation of the leading spark plug 20 is stopped, thus preventing the occurrence of a situation in which both of the glow plug and the leading spark plug are rendered inoperative and thereby ensuring a smooth transition in the operating conditions.

While, in the above-described embodiment, the control circuit 27 allows the leading spark plug 20 to remain in operation for the predetermined period of time determined by the delay circuit 357 due to the fact that the time required for the glow plug 22 to become capable of igniting the mixture is between 30 and 60 seconds when it is completely cold and between 10 and 20 seconds when it is considerably hot thus making no great difference therebetween, if more accurate control is desired, it is only necessary to maintain the leading spark plug 20 in operation until the actual temperature of the glow plug 22 detected by the thermocouple 222 attains a level which is capable of igniting the mixture. Of course, such control is not needed in cases where the leading spark plug is operated throughout the range of engine operating conditions, and such control may also be eliminated if the temperature of the glow plug 22 in the non-operated condition can be maintained at a predetermined level which is insufficient to cause preignition.

Further, while, in the above-described embodiment, only the glow plug 22 is operated during the periods of low speed and low load operation and the operation of the glow plug 22 is stopped at the other operations, what is most important for the glow plug 22 is that it is allowed to serve the igniting function during the periods of low speed and low load operation and it is not allowed to serve the igniting function during the periods of high load operation. As a result, the similar effects may be obtained by allowing the glow plug 22 to serve the igniting function during the periods of high speed and low load operation. On the other hand, what is important for the leading spark plug 20 is that it is allowed to serve the igniting function during the periods of high speed and low load operation and high load operation, and consequently the leading spark plug may be allowed to serve the igniting function during the periods of low speed and low load operation, although it is more effective not to allow the leading spark plug to serve the igniting function as in the case of the above-described embodiment.

We claim:

1. An ignition system for a rotary piston engine having a trochoidal housing and a rotor, comprising:

a leading spark plug mounted in said housing on the leading side with respect to the trochoidal minor axis of said housing in the direction of rotation of said rotor;

a trailing spark plug mounted in said housing on the trailing side with respect to said trochoidal minor axis in the direction of rotation of said rotor;

a glow plug mounted in said housing on the leading side with respect to said trochoidal minor axis in the direction of rotation of said rotor;

ignition means for causing said trailing spark plug to perform an ignition operation throughout the range of operating conditions of said engine;

a control circuit for allowing said glow plug to perform a mixture igniting function when said engine is under low speed and low load operation; and an ignition circuit for causing said leading spark plug to perform an ignition operation when said glow plug is not serving said mixture igniting function.

2. An ignition system as set forth in claim 1, wherein said glow plug is mounted on the leading side with respect to said leading spark plug in the direction of rotation of said rotor.

3. An ignition system as set forth in claim 1, wherein said ignition circuit stops the ignition operation of said leading spark plug when said engine is under said low speed and low load operation.

4. An ignition system as set forth in claim 1, wherein said control circuit stops the mixture igniting function of said glow plug when said engine is under low speed and high load operation.

5. An ignition system as set forth in claim 3, wherein said ignition circuit maintains the ignition operation of said leading spark plug for a predetermined time during the transition from said engine operation where the mixture igniting function of said glow plug is stopped to said low speed and low load operation.

* * * * *